United States Patent Office 2,918,513
Patented Dec. 22, 1959

2,918,513

DISPERSIBLE ARYL THIAZYL SULFIDES HAVING ADMIXED THEREWITH A MINERAL OIL AND A FATTY ACID ESTER

Robert H. Cooper, Nitro, and Kenneth L. Godfrey, St. Albans, W. Va., assignors to Monsanto Chemical Company, St. Louis, Mo., a corporation of Delaware No Drawing. Application August 23, 1955
Serial No. 530,212

9 Claims. (Cl. 260—785)

The present invention relates to an improved process of treating a rubber vulcanization accelerator of the aryl thiazyl sulfide type and particularly of the chemical compound 2,2'-dithiobis benzothiazole and related compounds. Such compounds as a class are very effective accelerators of the rubber vulcanization process, but they possess inherent defects due to their physical nature and properties which to a certain extent impair their usefulness and in some instances even preclude their application in certain types of rubber products.

By far the greater volume of fabricated rubber products are manufactured by the dry mixing procedure, that is by plasticizing the rubber on rubber mixing mills or Banbury mills and incorporating other dry compounding agents thereinto as required. In order to formulate a product, especially a tire, that will deliver safe, satisfactory and effective service, it is essential that finely ground powders be employed as compounding ingredients and which product or products will not agglomerate under the pressure of the mixing operation to form larger, non-dispersible agglomerates. Ideally, therefore, in the case of such essential components as vulcanization accelerators which are utilized in very small proportions in a rubber compound, liquids or solid products which melt below temperatures lower than those developed in the mixing operation should disperse most readily.

However, the aryl thiazyl sulfides are solids of relatively high melting point and as a consequence are difficult to disperse in a rubber composition. This lack of complete and homogeneous dispersion is apparent from the presence of small bits of packed, compressed particles of accelerator produced by the pressure developed by the milling procedure and such hard pieces, although small, result in small overcured areas in the finished product. Moreover, the aryl thiazyl disulfide accelerators have a tendency under applied pressure to stick to metals and hence there is a possibility of losing a portion of the accelerator on the mixing equipment when the rubber compound is masticated and mixed, especially when the mixing is carried out on open mills. This same difficulty may also take place in Banbury milling. Again, the poorer the dispersion of the accelerator, the longer the period of time required for the accelerator to blend with the rubber to produce a uniform and homogeneous dry mix, and this period required for the batch to "knit" as it is termed in the trade, especially in the Banbury cycle, is important, since if the milling time is extended unduly, over-plasticization results which causes variable and usually less desirable physical properties in the vulcanized product. Also, the aryl thiazyl disulfides, possessing as before mentioned, a high melting point, must be finely ground for use in rubber, and as a result of this extreme fineness will dust readily in handling and will fly from the rubber mills during the mixing operation. The dust is very bitter to the taste, is disagreeable in odor and is highly objectionable to those using or handling the product. It is the object of the present invention to greatly lessen or remove the various difficulties and objections previously mentioned as well as to improve the handling properties and effectiveness of the class of accelerators named.

Although oils alone, and particularly the higher gravity mineral oils of the lubricating oil range, have often been distributed over the surface of the thiazyl disulfides in quantities of approximately 2–5% by weight thereof, while improving the dustiness of the product and reducing its tendency to fly, unfortunately also increase the tendency of the disulfide to stick to the metal rolls and also usually fail to improve dispersion. In United States application Serial No. 466,240, filed November 1, 1954, it was disclosed that when a second ingredient, such as an alkyl ester of tall oil (45% rosin acids, 47% fatty acids, 8% unsaponifiable material) or sorbitan monopalmitate is added with the oil to the thiazyl disulfide, improvement in dispersion results. It has now been found that enhanced results as to dispersion as compared with an oil treated thiazyl sulfide follow from treatment of the accelerator with a lower alkyl ester of either a fatty acid containing at least 6 but not more than 18 carbon atoms or a rosin acid. The optimum proportion is about 2.5% dispersant by weight of the accelerator. A preferred embodiment of the invention entails the conjoint treatment of the accelerator with about 2.5% by weight of a light viscosity mineral oil, for example the grade known in the oil industry as 200 Pale Oil, and about 2.5% by weight of the ester dispersant.

The additives mentioned above may be added in any convenient manner to the benzothiazyl disulfides but preferably are added during the manufacture of the product to the slurry in which the precipitated disulfide is suspended, followed by filtering, washing, drying and grinding the product in the usual manner. Naturally the slurry containing the additives should be thoroughly agitated in order that the additives may be distributed as completely as possible over the surfaces of the solid component of the slurry. It is preferable to add the respective additives in substantially equal weight portions to the slurry and in such quantities that the combined additives do not exceed 5% of the dry weight of the thiazyl disulfide.

One method of testing the completeness of dispersion of a powder in rubber consists in breaking down on the mill a quantity of rubber and when it is plastic, adding thereto a quantity up to 25% its weight in the case of an accelerator, of the product under test. After the mixing is complete, the compounded rubber is sheeted from the rolls as a thin sheet. A portion of the sheet is then examined visually by examining before a light. The effectiveness of the examination is increased by stretching the sheet of compounded rubber. Any minute dark spots apparent in the sheet when so tested indicate undispersed material.

A more dependable testing procedure was developed after many experiments and was adopted as effective for differentiating between the many additives tested and also as duplicating within experimental error, successive tests with the same additive. The tests were carried out in a Type 00 Banbury mill. The procedure adopted as most satisfactory is as follows:

*Step 1.*—Break down smoked sheet rubber for 6½ minutes at second speed (76 r.p.m.) and with cooling water shut off. Then sheet the rubber out on a rubber mill and allow to stand at room temperature for about 16 hours.

*Step 2.*—Add the rubber sheets from Step 1 to the Banbury with the temperature at 50° C., breaking down for 1 minute at second speed with the ram down and with cooling water shut off.

*Step 3.*—Add the treated benzothiazyl disulfide to the broken down rubber from Steps 1 and 2 and mix for 5½ minutes at third speed (100 r.p.m.) with the ram up and with cooling water turned on. During the mixing observe the number of minutes required for the treated benzothiazyl disulfide accelerator to blend with the rubber to form a uniform dry mix (knitting time).

*Step 4.*—Discharge the masterbatch mix from the Banbury and pass twice through a rubber mill at 70° C. One pass is through the mill with the rolls 0.125 inch apart and one pass with the rolls 0.187 inch apart. While the distances specified are not of themselves critical, they were adopted as desirable practice. The sole object is to produce a relatively thin sheet of the rubber-accelerator mix.

*Step 5.*—Allow the sheeted masterbatch to stand for at least four hours and then make cuts in the sheet at several places and examine the cut section under an 8× magnifying glass to determine the effectiveness of the dispersion. In the table following, a rating of excellent indicates no visible particles, a rating of good indicates only a very few visible particles and a rating of fair indicates only occasional visible particles. Also, during the various milling steps, notice was taken of any visible caking of material on the Banbury rotors and walls as well as on the rolls of the rubber mill.

In the test results that follow, a batch charge comprised 1200 parts of smoked sheet rubber and 300 parts of 2,2′-dithiobis benzothiazole or other accelerator of the benzothiazole type. The accelerator with the quantities and types of treating agents incorporated as hereinbefore described were employed as shown in the table.

*Table*

|  | Percent 200 Pale Oil | Percent Treating Agent | Knitting Time | Caking | Dispersion |
|---|---|---|---|---|---|
| Accelerator |  |  | 2′00″ | slight | fair. |
| Do | 2.5 | 2.5 methyl laurate | 1′30″ | none | excellent. |
| Do | 2.5 | 2.5 ethyl octanoate | 1′45″ | slight | Do. |
| Do | 2.5 | 2.5 ethyl laurate | 2′00″ | v. slight | Do. |
| Do | 2.5 | 2.5 methyl octanoate | 3′30″ | v. v. slight | good—excellent. |
| Do | 2.5 | 2.5 methyl abietate | 2′30″ | slight | Do. |
| Do | 2.5 | 2.5 butyl stearate | 2′30″ | moderate | Do. |
| Do | 2.5 | 2.5 methyl hexanoate | 2′00″ | v. slight | good. |
| Do | 2.5 | 2.5 methyl myristate | 3′30″ | do | Do. |
| Do | 2.5 | 2.5 methyl stearate | 2′15″ | moderate | Do. |
| Do | 2.5 | 2.5 butyl oleate | 1′30″ | v. slight | Do. |
| Do | 2.5 | 2.5 octyl stearate | 1′30″ | heavy | fair. |
| Do | 2.5 | 2.5 methyl esters of fatty acids from oxidation of aliphatic hydrocarbons. | 2′45″ | none | good. |

The above results plainly indicate the dispersion properties of a benzothiazyl sulfide accelerator in rubber are improved by the additional presence of an ester of the class claimed. The most effective products comprise the methyl and ethyl esters of lauric and octanoic acids in which cases the knitting time is relatively short and caking is slight or non-existent. Several fractions of methyl esters of mixed fatty acids from the oxidation of aliphatic hydrocarbons were examined. These varied from relatively short to long chain compounds. The results were comparable but methyl esters of the lower acids dispersed the accelerator slightly more efficiently. As the oil preferred for use with the ester, it is most desirable to use a light engine oil of not over 200 Saybolt viscosity.

It is intended to cover all changes and modifications of the examples of the invention herein chosen for purposes of disclosure which do not constitute departures from the spirit and scope of the invention.

What is claimed is:

1. A composition consisting essentially of a dry finely powdered aryl thiazyl disulfide accelerator having intimately admixed therewith a small amount not more than approximately 5% by weight of but sufficient to reduce dustiness and improve dispersion, of a mixture of mineral oil of the lubricating oil range, the mineral oil being at least about 2% of the weight of the accelerator, and a lower alkyl ester of a lower monohydric alcohol and an acid selected from the group consisting of fatty acids containing at least 6 but not more than 18 carbon atoms and rosin acids, said ester being present in sufficient proportion to improve dispersion in rubber as compared to the accelerator mixed with the mineral oil alone.

2. A composition consisting essentially of a dry finely powdered benzothiazyl disulfide having intimately admixed therewith a small amount not more than approximately 5% by weight thereof but sufficient to reduce dustiness and improve dispersion, of a mixture of mineral oil within the light lubricating oil range, the mineral oil being at least about 2% by weight of the accelerator, and a lower alkyl ester of a lower monohydric alcohol and a fatty acid containing at least 6 but not more than 18 carbon atoms, the said ester being present in sufficient proportion to improve dispersion in the rubber as compared to the accelerator mixed with mineral oil alone.

3. A composition consisting essentially of dry finely powdered benzothiazyl disulfide having intimately admixed therewith a small amount not more than approximately 5% by weight thereof but sufficient to reduce dustiness and improve dispersion of a mixture of approximately 2.5% by weight mineral oil within the light lubricating oil range and a lower alkyl ester of a lower monohydric alcohol and a fatty acid containing at least 6 but not more than 18 carbon atoms, the said ester being present in sufficient proportion to improve dispersion in the rubber as compared to the accelerator mixed with mineral oil alone.

4. A composition consisting essentially of dry finely powdered benzothiazyl disulfide having intimately admixed therewith approximately 2.5% by weight thereof of each of a mineral oil within the light lubricating oil range and a lower alkyl ester of a lower monohydric alcohol and a fatty acid containing at least 6 but not more than 18 carbon atoms.

5. A composition consisting essentially of dry finely powdered benzothiazyl disulfide having intimately admixed therewith approximately 2.5% by weight thereof of a light mineral oil having a viscosity of about 200 Saybolt seconds and approximately 2.5% by weight thereof of methyl laurate.

6. A composition consisting essentially of dry finely powdered benzothiazyl disulfide having intimately admixed therewith approximately 2.5% by weight thereof of a light mineral oil having a viscosity of about 200 Saybolt seconds and approximately 2.5% by weight thereof of ethyl octanoate.

7. A composition consisting essentially of dry finely powdered benzothiazyl disulfide having intimately admixed therewith approximately 2.5% by weight thereof of a light mineral oil having a viscosity of about 200 Saybolt seconds and approximately 2.5% by weight thereof of ethyl laurate.

8. A composition consisting essentially of dry finely powdered benzothiazyl disulfide having intimately admixed therewith approximately 2.5% by weight thereof of a light mineral oil having a viscosity of about 200 Saybolt seconds and approximately 2.5% by weight thereof of methyl abietate.

9. A composition consisting essentially of dry finely powdered benzothiazyl disulfide having intimately admixed therewith approximately 2.5% by weight thereof of a light mineral oil having a viscosity of about 200 Saybolt seconds and approximately 2.5% by weight thereof of butyl oleate.

References Cited in the file of this patent

UNITED STATES PATENTS

| | | |
|---|---|---|
| 2,489,704 | Davis | Nov. 29, 1949 |
| 2,598,319 | Throdahl | May 27, 1952 |
| 2,640,088 | Glenn et al. | May 26, 1953 |

FOREIGN PATENTS

| | | |
|---|---|---|
| 712,332 | Great Britain | July 21, 1954 |

FOREIGN PATENTS

Chatfield: "Varnish Constituents," 3rd Edition (1953), published by Leonard Hill Limited (London), page 212.